United States Patent Office 3,457,663
Patented July 29, 1969

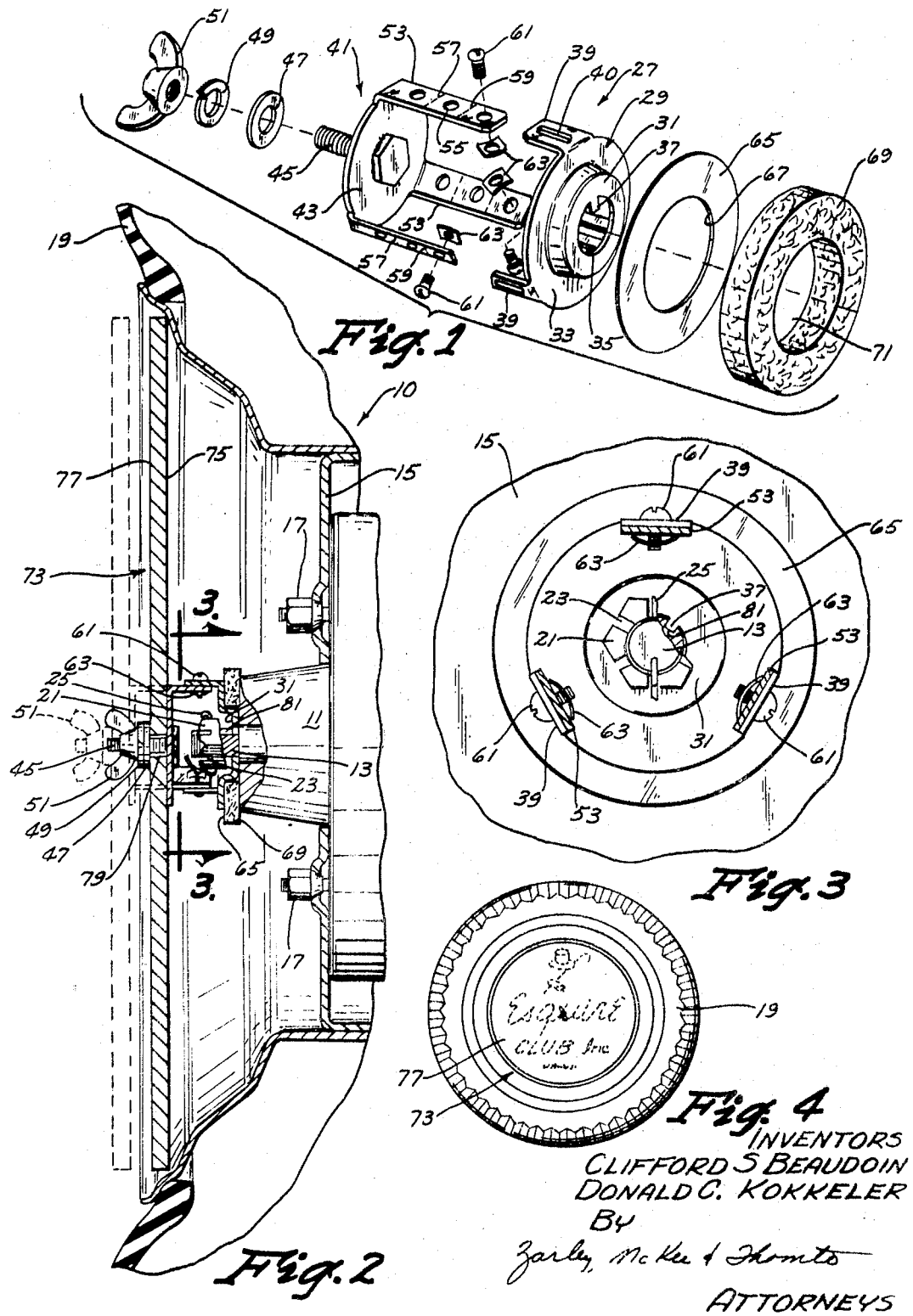

3,457,663
ADVERTISING DISPLAY DEVICE
Clifford S. Beaudoin, 820 10th Ave. W., Dickinson, N. Dak. 58601, and Donald C. Kokkeler, Belfry, Mont. 59008
Continuation-in-part of application Ser. No. 515,900, Dec. 23, 1965. This application Feb. 8, 1968, Ser. No. 704,061
Int. Cl. G09f 7/00
U.S. Cl. 40—129                  8 Claims

ABSTRACT OF THE DISCLOSURE

An advertising display device for use on vehicle wheels including a first bracket mounted on the vehicle front axle between the axle nut and the hub means. The first bracket has a plurality of flat arms extending outwardly therefrom which are adapted to detachably receive a plurality of flat arms extending inwardly from a second bracket. A flat disk having advertising indicia thereon is detachably secured to the second bracket and does not rotate as the vehicle is driven. The device also includes means to permit its adaptation to a variety of vehicles as well as a dust seal means at the inner end of the first bracket.

---

This application is a continuation-in-part application of the application, Ser. No. 515,900 filed Dec. 23, 1965, now Patent No. 3,381,400.

Advertising display devices adapted for use on vehicle wheels have heretofore been unsatisfactory for several reasons, among them being: (1) the existing devices are not easily and quickly attachable to a vehicle wheel; (2) the existing devices are not adapted to be operatively rigidly secured to the vehicle axle assembly which causes said devices to become disengaged therefrom; (3) existing devices permit foreign material such as dust or the like to enter the vehicle wheel bearings; (4) the existing devices are difficult and expensive to manufacture; and (5) the existing devices are not adaptable to a variety of different vehicles.

Therefore, it is a principal object of this invention to provide an improved advertising display device adapted for use on vehicle wheels.

A further object of this invention is to provide an advertising display device which is quickly and easily secured to a vehicle axle assembly.

A further object of this invention is to provide an advertising display device which will not become disengaged from the vehicle axle assembly.

A further object of this invention is to provide an advertising display device having a seal means thereon to prevent foreign material from entering the vehicle wheel bearings.

A further object of this invention is to provide an advertising display device which is operatively secured to a vehicle wheel but does not rotate therewith.

A further object of this invention is to provide an advertising display device which is easy to manufacture.

A further object of this invention is to provide an advertising display device including a supporting means which is operatively mounted on the axle and which need not be removed therefrom when the vehicle wheel is removed from the hub means.

A further object of this invention is to provide an advertising display device which is adaptable for use on a variety of different vehicles.

A further object of this invention is to provide an advertising display device which is durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an exploded rear perspective view of the display disk supporting means;

FIG. 2 is a partial sectional view of the advertising display device mounted on a vehicle wheel;

FIG. 3 is an enlarged fragmentary sectional view as seen along lines 3—3 of FIG. 2 with portions thereof cut away to more fully illustrate the invention; and FIG. 4 is an elevational view of the advertising display device mounted on a vehicle wheel.

In FIG. 2, the numeral 10 generally designates a vehicle wheel assembly including a rotatable hub 11 having a non-rotatable axle 13 extending therethrough and a wheel rim 15 operatively secured to hub 11 by means of stud bolt and nut assemblies 17. The tire 19 is mounted on rim 15 in conventional fashion and is partially illustrated in FIG. 2. The outer end of axle 13 is externally threaded and is adapted to threadably receive a hexagonal axle nut 21 thereon. Axle nut 21 is of conventional design and is provided with a plurality of notches 23 formed therein. A cotter pin 25 extends through a pair of aligned notches 23 and axle 13 to prevent rotation of nut 21 with respect to axle 13. Conventional wheel bearings are mounted in hub 11 and embrace axle 13 to permit rotation therebetween.

The numeral 27 generally designates the disk supporting means as best seen in FIG. 1. Disk supporting means 27 includes a first bracket 29 having a central cup portion 31 and a flange portion 33 extending outwardly therefrom as best illustrated in the drawings. The inner wall of cup portion 31 is provided with an opening 35 and a key 37 extending thereinto as best illustrated in FIG. 1. A plurality of flat arms 39 extend outwardly from the periphery of flange 33 and are each provided with an elongated slot 40 formed therein.

A second bracket 41 is also illustrated in FIG. 1 and includes a central portion 43 having a bolt 45 secured thereto and extending outwardly therefrom. Bolt 45 is adapted to receive washer 47, lock washer 49 and wing nut 51 thereon. The bracket 41 is provided with a plurality of flat arms 53 extending rearwardly therefrom which are adapted to slidably engage the arms 39 as illustrated in FIGS. 2 and 3. Each of the arms 53 are provided with a plurality of openings 55 formed therein along the length thereof as illustrated in FIG. 1. The arms 53 are also scored at 57 and 59 to facilitate breaking off portions of the lengths of arms 53 to permit the device to be adapted to a variety of different vehicles. A screw 61 extends through one of the openings 55 and the slot 40 to effect the connection between each of the arms 39 and 53 and is maintained therein by a clip nut 63.

A plastic disk 65 having a central opening 67 is positioned adjacent the inner surface of the flange 33 of bracket 29 so that cup portion 31 partially extends through central opening 67. A seal 69 is secured to the inner surface of disk 65 by any suitable means such as by an adhesive or the like and is comprised of a hair-felt substance. Seal 69 is of a sufficient thickness so that the inner surface thereof terminates approximately 1/16 of an inch inwardly of the inner surface of cup portion 31. As seen in FIG. 1, seal 69 is provided with a central opening 71 adapted to receive the cup portion 31. The numeral 73 generally designates the advertising display disk having inner and outer surfaces 75 and 77 respectively. Disk 73 is provided with an aperture 79 at its center which is adapted to receive bolt 45 extending therethrough. Disk 73 may be constructed to any suitable material such as Masonite, plastic, metal or the like. Brackets 29 and 41 are preferably constructed of a suitable metal material such as steel, tin or the like. Disk 65 is preferably constructed of a suitable plastic material.

The device is mounted on a vehicle wheel as follows: The hub cap normally mounted on the vehicle wheel is removed therefrom by any convenient means. The dust cap covering axle nut 21 is removed from the outer end of hub 11 by means of a screw driver or the like. Cotter key 25 is then removed and the axle nut 21 is removed from the axle 13. Bracket 29 together with the disk 65 and the seal 69 is then mounted on the axle 13 so that the inner surface of seal 69 engages the outer end of hub 11 as illustrated in FIG. 2. The axle nut is then rethreaded on the axle 13 and the inner end of the axle nut would engage the outer surface of the cup portion 31 and would be received therein as partially illustrated in FIG. 2. Cotter key 25 would then be reinserted in the axle nut and the axle.

Bracket 41 is then detachably secured to bracket 29 by extending the bolts 61 through one of the openings 55 in each of the arms 53 and through the slots 41 in each of the arms 39. The lengths of the arms 53 can be adapted for use on any different vehicle by simply breaking off a predetermined portion of the length thereof along either of the score lines 57 or 59. It can also be appreciated that the elongated slot 40 and the arms 39 also prevent the bracket 41 to be moved outwardly or inwardly with respect to the bracket 29. The alteration of the lengths of the arms 53 together with the slidable movement of the screw 61 in slots 40 permits the disk 73 to be moved outwardly or inwardly with respect to the axle nut so that the device can be adapted to wheels having different rim widths. The disk 73 is mounted on the bolt 45 and the washers 47 and 49 are positioned thereon and the wing nut 51 is securely tightened on the nut 45 to prevent rotation of the disk 73 with respect to the bolt 45.

The device described herein accomplishes new and useful results in the advertising display device art due to the unique structure thereof. A device has been described herein which permits easy and quick attachment of an advertising display disk to a vehicle wheel and which is operatively rigidly secured thereto. The device will not become inadvertently detached from the vehicle bracket 29 with respect to axle 13 is prevented due to the key 37 being received in the groove 81 formed in the axle 13. Disk 73 is prevented from rotation with respect to the disk supporting means 27 due to wing nut 51 securely maintaining the inside surface of disk 73 in engagement with the outer surface of bracket 41. Seal 69 engages the outer end of hub 11 to prevent foreign material from entering the interior of hub 11 to prevent damage to the wheel bearings therein.

Thus it can be seen that the device accomplishes at least all of its stated objectives.

Some changes may be made in the construction and arrangement of our advertising display device without departing from the real spirit and purpose of our invention, and it is our intention to cover by our claims, any modified forms of structure or use of mechanical equivalents which may be reasonably included within their scope.

We claim:

1. In an attachment for a vehicle wheel assembly including a non-rotatable axle, a hub means rotatably mounted on said axle, a wheel means operatively secured to said hub means and an axle nut on said axle maintaining said hub means on said axle, a first supporting means embracing said axle between said axle nut and said hub means and having inner and outer ends, said first supporting means having a plurality of spaced apart arm members extending outwardly therefrom, a second supporting means having inner and outer ends and having a plurality of spaced apart arm members extending inwardly therefrom adapted to be detachably secured to said first supporting means arm members, said arm members of said first and second supporting means being adapted to be selectively length adjustably secured together whereby the distance between said second supporting means can be varied with respect to said first supporting means, a flat disk, and means detachably securing said flat disk to the outer end of said second supporting means.

2. The attachment of claim 1 wherein a seal means is operatively secured to the inner end of said first supporting means which engages the outer end of the hub means to prevent foreign material entering therein.

3. The attachment of claim 2 wherein the inner end of said seal means extends inwardly of the inner end of said first supporting means.

4. The attachment of claim 2 wherein said seal means has a diameter less than the central opening of the wheel means.

5. In an attachment for a vehicle wheel assembly including a non-rotatable axle, a hub means rotatably mounted on said axle, a wheel means operatively secured to said hub means and an axle nut on said axle maintaining said hub means on said axle.

a first supporting means embracing said axle between said axle nut and said hub means and having inner and outer ends, said first supporting means having a plurality of spaced apart arm members extending outwardly therefrom, a second supporting means having inner and outer ends and having a plurality of spaced apart arm members extending inwardly therefrom adapted to be detachably secured to said first supporting means arm members, a flat disk, means detachably secruing said flat disk to the outer end of said second supporting means, a seal means operatively secured to the inner end of said first supporting means which engages the outer end of the hub means to prevent foreign material entering therein, said first supporting means including a disk shaped portion having a central opening formed therein through which said axle extends, a backing disk positioned adjacent the inner end of said disk shaped portion, said seal means being positioned adjacent the inner end of said backing disk.

6. The attachment of claim 5 wherein said disk shaped portion of said first supporting means includes a cup-shaped portion extending inwardly therefrom, said backing disk and said seal means embracing said cup-shaped portion, said axle nut being received by said cup-shaped portion at the outer end thereof.

7. In an attachment for a vehicle wheel assembly including a non-rotatable axle, a hub means rotatably mounted on said axle, a wheel means operatively secured to said hub means and an axle nut on said axle maintaining said hub means on said axle, a first supporting means embracing said axle between said axle nut and said hub means and having inner and outer ends, said first supporting means having a plurality of spaced apart arm members extending outwardly therefrom, a second supporting means having inner and outer ends and having a plurality of spaced apart arm members extending inwardly therefrom adapted to be detachably secured to said first supporting means arm members, a flat disk, and means detachably securing said flat disk to the outer end of said second supporting means, said first supporting means arm members having elongated slots therein adapted to receive a fastening means extending therethrough and through said second supporting means arm members.

8. In an attachment for a vehicle wheel assembly including a non-rotatable axle, a hub means rotatably mounted on said axle, a wheel means operatively secured to said hub means and an axle nut on said axle maintaining said hub means on said axle, a first supporting means embracing said axle between said axle nut and said hub means and having inner and outer ends, said first supporting means having a plurality of spaced apart arm members extending outwardly therefrom, a second supporting means having inner and outer ends and having a plurality of spaced apart arm members extending inwardly therefrom adapted to be detachably secured to said first supporting means arm members, a flat disk, and means detachably securing said flat disk to the outer end of said second supporting means, said second supporting arm members having a plurality of openings formed therein along the length thereof, predetermined portions of said second supporting arm members being easily removable therefrom.

References Cited

UNITED STATES PATENTS

| | | | |
|---|---|---|---|
| 897,615 | 9/1908 | Geserich | 40—129 |
| 1,045,558 | 11/1912 | Jobe | 40—129 |
| 1,478,475 | 12/1923 | Jago et al. | 40—129 |

EUGENE R. CAPOZIO, Primary Examiner

WENCESLAO J. CONTRERAS, Assistant Examiner